United States Patent [19]
North

[11] Patent Number: 5,450,535
[45] Date of Patent: Sep. 12, 1995

[54] GRAPHS EMPLOYING CLUSTERS
[75] Inventor: Stephen C. North, Califon, N.J.
[73] Assignee: AT&T Corp., Murray Hill, N.J.
[21] Appl. No.: 126,935
[22] Filed: Sep. 24, 1993
[51] Int. Cl.[6] .......................................... G06F 15/00
[52] U.S. Cl. .................................................. 395/140
[58] Field of Search ............... 395/140, 141, 142, 118; 345/131, 24; 382/54, 56

[56] References Cited
PUBLICATIONS

K. Sugiyama, et al., "Visualization of Structural Information: Automatic Drawing of Compound Digraphs", *IEEE Transactions on Systems, Man, and Cybernetics*, vol. 21, No. 4, Jul./Aug. 1991, pp. 876-892.

P. Brown, et al., "An Object Oriented Layout for Directed Graphs", *IEEE*, 1992, pp. 164-171.

F. N. Paulisch, et al., "EDGE: An Extendible Graph Editor", *Software-Practice and Experience*, vol. 20(S1), S1/63-S1/88 (Jun. 1990).

E. B. Messinger, et al., "A Divide-and-Conquer Alogrithm for the Automatic Layout of Large Directed Graphs", *IEEE Transactions on Systems, Man and Cybernetics*, vol. 21, No. 1, Jan./Feb. 1991, pp. 3-12.

*Primary Examiner*—Phu K. Nguyen
*Attorney, Agent, or Firm*—Gordon E. Nelson

[57] ABSTRACT

Techniques for automatically laying out directed graphs with clusters of nodes and free nodes. The techniques produce pictorial representations of the graphs in which a node in a cluster and a free node may belong to the same rank in the graph and nodes belonging to more than one cluster may belong to the same rank. The techniques have been added to the well-known DOT system for laying out directed graphs, and include a recursive technique for ranking nodes of the graph, a technique for ordering nodes within ranks which collapses subclusters into skeletons when the nodes within a cluster are ordered, and a technique for positioning the nodes after they have been ranked and ordered which obtains the x coordinates for the nodes by producing an auxiliary graph which is in effect the original graph "turned on its side" and assigning ranks to the nodes in the auxiliary graph.

12 Claims, 12 Drawing Sheets

FIG. 18

```
digraph G {
    a -> b;
    s -> t;
    t -> z;
    subgraph cluster3 {
        p -> q;
        p -> r;
    } subgraph cluster1 {
        b -> c -> d -> e;

b -> f;

subgraph cluster2 {
            f -> g;
            f -> h;
            h -> j;
            g -> i -> j;
        } j -> e;
    }
    a -> p;
    e -> z;
    q -> g;
    i -> s;
}
```

GRAPHS EMPLOYING CLUSTERS

BACKGROUND OF THE INVENTION

1. Field of the Invention

The invention concerns the graphical display of information and more particularly concerns the graphical display of directed graphs.

2. Description of the Prior Art

Directed graphs (digraphs) are a common way of representing hierarchical or asymmetric relationships among elements from a set. Digraphs arise naturally in descriptions of processes and work flows, control flow and data dependencies in computer software, in representations of finite state machines, and other applications. Layouts or drawings of graphs can help to make graphs more understandable by revealing their structure. For this reason hand-drawn layouts are often used in documentation. The problem is that manual graph layout is tedious and difficult. This has lead to the invention of automatic layout programs. Here, the user creates a specification of nodes and edges for input to the layout generator. The specification may be entered through a text editing program or may be created by means of utility programs that extract graph specifications from other forms of data such a program source code. The specification does not necessarily contain any geometric coordinates. The layout system then reads this specification, executes algorithms to determine node and edge coordinates, and generates a graphics file which contains a representation of the drawing of the graph. The file may be transmitted to a computer screen for display or to a printer for printing, or saved on an external storage device for future use.

Often, nodes in graphs of complex systems can be classified into subgraphs. We use the term "cluster" to refer to node-induced subgraphs that are drawn in the layout using a box to outline the nodes of the cluster. This box may not contain any nodes not in the cluster. We will assume that the classification of nodes into clusters is performed either by the user or by an external utility or by any other appropriate technique. Typically the classification depends on either application-dependent information, or on syntactical properties of the graph. If this decomposition is recursive, then the clusters are nested. For example, process decomposition diagrams from formal methods in software engineering can exhibit such structure. (See Harry S. Delugach, "Specifying Multiple-Viewed Software Requirements with Conceptual Graphs", *Journal of Systems Software* 19, pp. 207–224, 1992; Robert W. Krut, Jr. and David P. Wood, "Evaluation of Process Modeling Improvements", *Technical Report* CMU/SEI-91-TR5, Software Engineering Institute, Carnegie-Mellon University, April 1991.)

The most salient previous work in this area is the "compound graph" layout technique of Sugiyama and Misue (see "Visualization of Structural Information: Automatic Drawing of Compound Digraphs", *IEEE Transactions on Systems, Man, and Cybernetics* SMC-12:4, pp. 876–892, July 1991.) This is a collection of heuristics for drawing digraphs with nested clusters. The technique supports not only layout of simple or conventional node-to-node edges, but also "compound" i.e. node-to-cluster and cluster-to-cluster edges as seen in FIG. 11. The Edge system of Newbery and Tichy also handles nested layouts by straightforward recursion (see Frances Newbery Paulish and Walter F. Tichy, "EDGE: An Extendible Graph Editor," *Software: Practice and Experience*, 20:S1, pp. 1/63–S1/88, 1990; also Frances Newbery Paulisch, *The design of an extendible graph editor*, Ph.D. thesis, University of Karlsruhe, January 1992.) A graph from this work is depicted in FIG. 13. Messinger et al implemented a recursive layout technique in the Compoze system. Here the main objective was to improve performance, thus clusters are an data structure, but not explicitly drawn in the output (see E. B. Messinger, L. A. Rowe and R. H. Henry, "A Divide-and-Conquer Algorithm for the Automatic Layout of Large Directed Graphs," *IEEE Transactions on Systems, Man and Cybernetics*, SMC-21:1, pp. 1–12, 1991.) Such internal clusters are noticeable in the layout of FIG. 12, which is from their work. Brown and Gargiulo describe a technique of making nested graph layouts according to somewhat different aesthetic criteria than ours, employing a nested box notation to replace edges and thereby reduce clutter in layouts (see P. Brown and T. Gargiulo, "An Object Oriented Layout for Directed Graphs", *Proc. IEEE Symposium on Assessment of Quality Software Development Tools*, pp. 164–171, May 1992).

There are similarities between directed graph layout and circuit layout (VLSI or board level), but there is a fundamental difference. In either case the user specifies the components and their interconnections. The system then determines the placement of components and the routing of interconnections. The difference is in the kind objective functions that measure layout quality. The objective of graph visualization is to assist human understanding of graph data. For circuit layout the objective is to optimize circuit performance by reducing critical path delays, power consumption, layout area, etc. These lead to vastly different layout styles. For further discussion of readability of graph layouts and related diagrams, we refer to Eades et al (P. Eades and R. Tamassia, "Algorithms for Drawing Graphs: An Annotated Bibliography," Brown University Dept. of Computer Science, Technical Report CS-09-89, 1989. An updated version is available as a PostScript file by anonymous ftp to wilma.cs.brown.edu in pub/gdbiblio.ps.Z. See also P. Eades and L. Xuemin, "How to Draw a Directed Graph," *Proc. IEEE Workshop on Visual Languages* (VL '89), pp. 13–17, 1989.)

As is apparent from the foregoing discussion, the layout of directed graphs which are to be read by human beings must take into account readability, aesthetics, and compactness of representation. It is an object of the invention disclosed herein to automatically produce directed graphs which are more readable, better looking, and more compact than those proviced by the prior art.

SUMMARY OF THE INVENTION

The graph drawing techniques of the invention trade off local and global layout decisions. Thus, the internal layout of individual clusters is appropriate when they are considered apart from the rest of the drawing, yet the global layout is also informative and aesthetically pleasing. Graphs made according to our techniques thus avoid the problem pointed out by Messinger: that when either global placement of clusters or their interior layout is fixed too early, as by simple recursion, then poor layouts can result.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 2 including

FIG. 4 including

FIG. 18 shows the input listing for the graph of FIG. 1.

Figure 1:
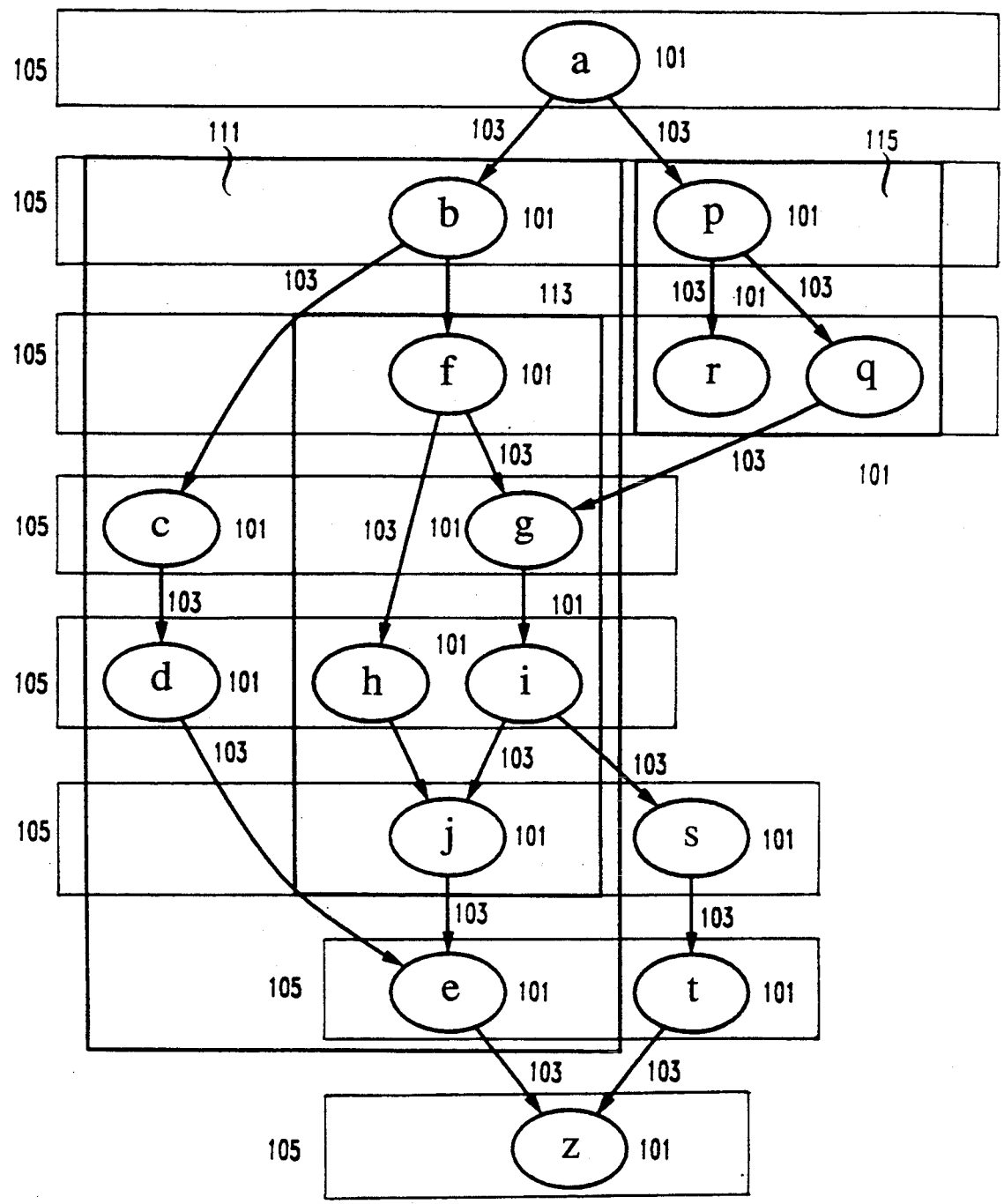
FIG. 1 is an example of a graph drawn with the techniques of the present invention.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first introduce the invention and explain its relationship to the well-known DOT layout system and will then explain the new techniques employed in the invention in detail.

INTRODUCTION

Our invention is a method of drawing directed graphs with nested clusters, as illustrated in FIGS. (1, 8, 10, 15, 16, 17). The input file specifies the nesting structure of clusters in addition to the conventional list of nodes and edges (and optional graphical display specification to control features such as shapes, colors, styles, and font selections). In the output layout, clusters are drawn in non-overlapping or nested boxes as appropriate to depict subgraphs.

In the following discussion we will use the graph of FIG. 1 as the principal example. Components marked 101 are the nodes of the graph. Components 103 are the edges (also called arcs). Groups of nodes marked 105 are ranks. Components 111, 113, and 115 are clusters. In the example, cluster 113 is nested inside cluster 111. FIG. 18 is the corresponding input file for the layout of FIG. 1.

The preferred implementation of our invention is a modification of the DOT layout system. This system is comprised of 1. graph representation and file I/O routines
2. rank assignment algorithm
3. mincross algorithm
4. final coordinate assignment algorithm
5. spline fitting algorithm
6. graphics code generator We have previously described these components of the DOT layout system elsewhere (see E. R. Gansner, E. Koutsofios, S. C. North, and K. P. Vo, "A Technique for Drawing Directed Graphs," *IEEE Transactions on Software Engineering* 19:3, pp. 214–230, March 1993; S.C. North and K. P.-Vo, "Improved Libraries for Dictionaries and Abstract Graphs," *USENIX Winter Conference Proceedings*, pp. 1–11, January 1993.) These publications are hereby incorporated by reference into the present patent application. In the following discussion we will explain how components 2, 3, 4 of DOT have been modified to handle cluster layout.

DATA STRUCTURES

The following data structures are used in our technique to represent nodes, edges, and graphs and subgraphs. All layout dimensions assume the default coordinate system of 72 units per inch.

| Node Attributes | |
| --- | --- |
| width | X coordinate dimension of node shape |
| height | Y coordinate dimension of node shape |
| rank | integer rank assignment (0 denotes least rank i.e. top of layout) |
| order | left to right index with respect to nodes in the same rank of the layout |
| type | REAL, VIRTUAL, or RANKLEADER (see section 4). |
| Edge Attributes | |
| weight | relative cost of edge in the layout (default 1.0) |
| minlen | minimum length or rank difference between head and tail (default 1) |
| headport | coordinate of head endpoint with respect to head node center |
| tailport | coordinate of tail endpoint with respect to tail node center |
| to_virtual | pointer to a temporary edge representing this edge in the layout |
| to_original | pointer to an input edge that this edge represents in the layout |
| count | number of edges represented by this edge (default 1) |
| Graph/Subgraph Attributes | |
| nodesep | minimum separation between adjacent nodes and/or cluster boundaries |
| minrank | least rank number of any node |
| maxrank | greatest rank number of any node |
| vlist | two-dimensional array of nodes indexed by rank and order |

Figure 2A:
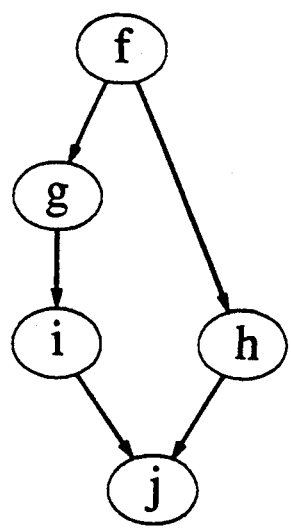
FIGS. 2A-2D shows how rank assignment was done in the graph of FIG. 1.
Figure 2C:
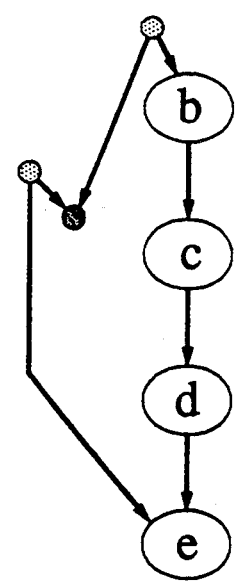
Figure 2D:
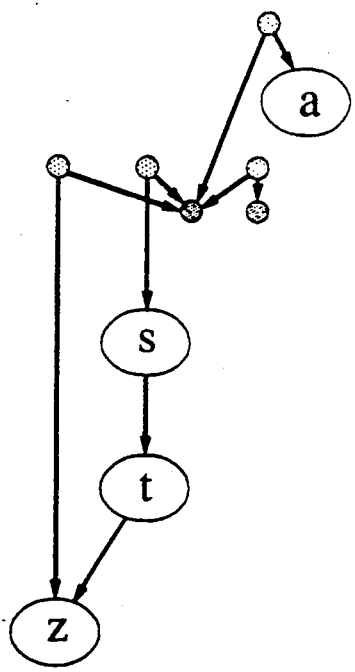
Figure 2B:
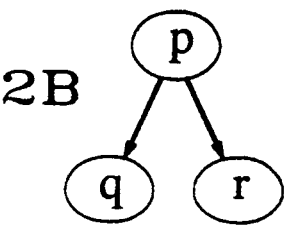
Figure 3:
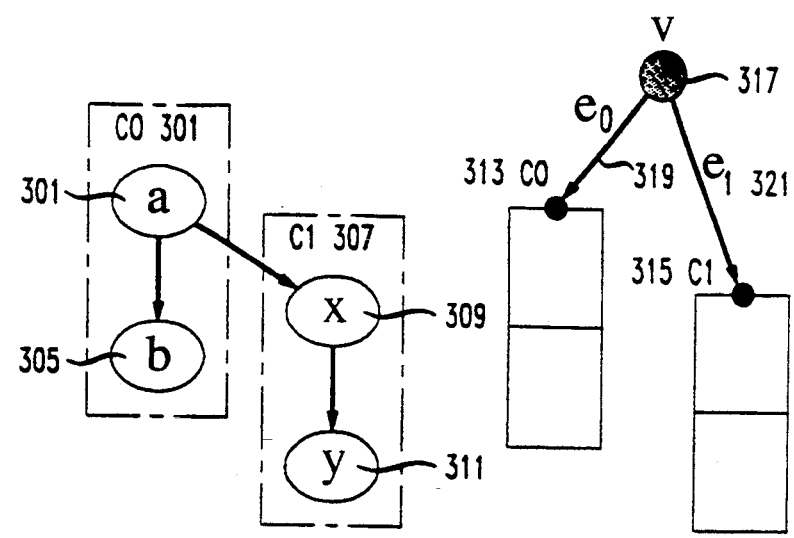
FIG. 3 shows how inter-cluster edges are handled when graphs are drawn according to the techiques of the invention.
Figure 12:
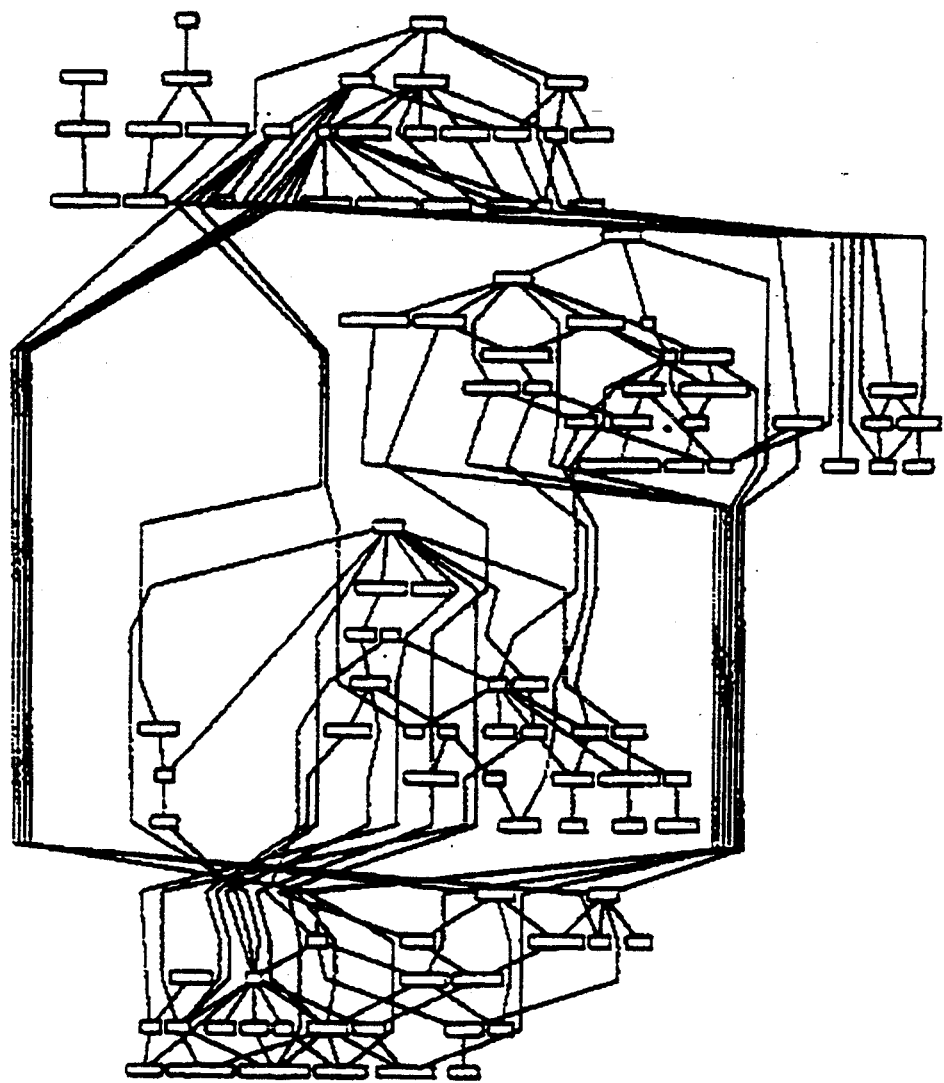
FIG. 12 shows another graph drawn using prior-art techniques.

RANK ASSIGNMENT: FIGS. 1, 2, and 3

We will assume that the layout is to have a top-to-bottom orientation for aiming arrows. Alternative orientations, such as left to right, are supposed by performing a standard graphics transformation on the input and output coordinates of a top-to-bottom drawing. Therefore it suffices to consider only the top-to-bottom case.

Integer rank assignments of nodes in a graph G that possibly contains clusters, are computed by the main procedure rank(G) and a recursive procedure compute—relative—ranks(G). This procedure assumes that any node belongs to at most one cluster at any level of nesting. If desired, this condition may be enforced by an external pre-processing step (not described here).

```
1.   rank (G)
2.      break__cycles(G)
3.      compute__relative__ranks(G)
4.      compute__absolute__ranks(G)
5.   end
6.   compute__relative__ranks(G)
7.      for H in subgraphs(G) do
8.         compute__relative__ranks(H)
9.         collapse(H)
10.     end
11.     for e in edges(G) do
12.        if (e has a bound node)
13.           proxy__edges(e)
14.     end
15.     network__simplex(G)
16.  end
```

We omit discussion of break—cycles (line 2) and network—simplex (line 14) as these routines have already been described (U.S. patent E. R. Gansner, S. C. North, and K. P.-Vo, "A method for drawing directed graphs," U.S. Pat. No. 4,953,106, August 1990; also Gansner, Koutsofios, North, Vo, ibid), which is hereby incorporated into the present application by reference. The main idea is that any cycles in the input graph are broken by reversing back-edges that are detected in a depth-first search. Reversed edges are marked by a boolean flag, so that arrowheads in the output drawing reflect the original orientation.

Procedure "compute—relative—ranks" in lines 6–14 determines a rank assignment for nodes of G. G may be a main graph or a cluster subgraph. We classify nodes in G as bound if they are contained in a subcluster of G, otherwise they are free. At exit, three conditions are satisfied. First, each free nodes of G is labeled with its rank assignment. Second, each bound node of G is labeled with its rank assignment with respect to the lowest-level cluster to which it belongs. (It is assumed that every node belongs to no more than one cluster at any level of nesting. If desired, this condition may be enforced by external pre-processing.) Third, every cluster inside G is labeled with the rank assignment offset of its nodes relative to the free nodes of G. Note that this labeling determines a global rank assignment of nodes. We defer this computation until the point where all relative rank assignment are known (line 4).

compute—relative—ranks begins with finding the relative rank assignments of nodes within clusters of G by recursion (lines 7–8). The recursion terminates at leaf clusters (not containing any sub-clusters). The relative rank assignment does not depend on any nodes or edges outside G. The effect on the layout is that clusters are compact and their layouts help to emphasize their internal hierarchy. Because relative rank assignments of bound nodes are fixed, each cluster H is collapsed (line 9) into a new temporary or "virtual" node $v_H$ associated with H. Nodes of ti are temporarily removed from G and stored in an auxiliary list.

After all clusters have been ranked and collapsed in this way, the remainder of the algorithm (lines 11–18) ranks the the nodes and collapsed clusters within G. The edges of G are scanned, and edges with an endpoint that is bound are temporarily replaced by the structure shown in FIG. 3. The structure is produced by the function proxy—edges.

Ranks of a cluster H are treated as ports of the node $v_H$, where the ith rank of H is translated to a port with coordinate (i, 0) offset from the center of $v_H$. The treatment of ports then follows the method of Gansner, Koutsofios, North, Vo, ibid, in adjusting the minimum length of inter-cluster edges according to the node port offsets. In FIG. 3, clusters 301 and 307 are collapsed into virtual nodes 313 and 315. The inter-cluster edge 302 is replaced by virtual node 317 and virtual edges 319 and 321. To compute the minlength of edges 319 and 321, we examine the local ranks of endpoints 303 and 309. Let $r=\text{rank}(node309)-\text{rank}(node303)+1$. (The constant 1 is the desired rank difference from the tail to the head when the clusters are placed.) In the general case, if $r>0$ set minlen(edge 321)=$r+m_0$ and minlen(edge 319)=$m_0$. Otherwise set minlen(edge 319)=$-r+m_0$ and minlen(edge 321)=$m_0$. (Typically $m_0=0$, but in the accompanying figures $m_0=1$ to avoid 0-length edges in diagrams.) To favor the desired edge orientation, set the weight(node 319)=321 and weight(edge 319)=$w_0$. In our implementation, $w_0=10$. The collapse of H (line 9) cannot create inter-cluster cycles of directed edges (which would cause an error in the procedure network—simplex) because inter-cluster edges are replaced as shown. Although, as a consequence, it is possible that intercluster edges may not always be oriented in the direction of increasing global rank number, the imbalance in virtual edge weights strongly favors the desired top-to-bottom orientation.

At exit from "compute—relative—ranks" in line 16, ranks have been assigned to free nodes and clusters (as represented by virtual nodes). A global rank assignment of all nodes is then performed by separate traversal in procedure "compute—absolute—ranks" called from line 4. Here, any free node v in a cluster H is adjusted:

$$\text{rank}(v)=\text{rank}(v_H)+\text{rank}(v)$$

The advantage of this rank assignment method over previous methods is that clusters are permitted to overlap vertically with other clusters and free nodes while still generally following the intended top-to-bottom orientation of edges. This yields layouts that are more compact than previous approaches where clusters are collapsed into meta-nodes and placed on discrete, non-overlapping ranks. In the latter case, the widely varying sizes of cluster meta-nodes can cause a significant loss of layout area due to lack of compaction, and edges may be stretched unnecessarily, making layouts harder to read.

We will describe how the technique is applied in the case of the example graph of FIG. 1. FIG. 2(a) and 2(b) show the initial rank assignment of clusters 113 and 115. FIG. 2(c) shows the rank assignment of cluster 111, with cluster 113 collapsed and replaced by the proxy structure. Finally, FIG. 2(d) shows the rank assignment of the main graph, with 111 and 113 similarly collapsed. The global rank assignment of nodes in 111, 113, and 115 (as shown in the FIG. 1) is determined by adding the offset of $v_H$. For example, rank($v_{111}$) in FIG. 2(d) is 1, and node d has relative rank 3 within cluster 111, therefore its global rank number is $1+3=4$.

Comparison of FIGS. 7 and 8, and FIGS. 9 and 10 demonstrates how this technique of cluster rank assignment yields more compact and informative layouts than previous methods.

NODE ORDER WITHIN RANKS: FIGS. 1, 4

The input to this phase is a ranked graph G possibly containing clusters. The input rank assignment may be determined by the algorithm of section 2, or any other technique. The output is a labeling of node order within a given rank (0 is the leftmost position). The ordering allows clusters to be drawn with nonoverlapping bounding rectangles. The necessary output condition is: If $C_0$ and $C_1$ are clusters such that neither is an ancestor of the other, and $u_0 \in C_0$, $u_1 \in C_1$ such that rank($u_0$)=rank($u_1$) and order($u_0$)<order($u_1$), then there do not also exist $v_0 \in C_0$, $v_1 \in C_1$ such that rank($v_0$)=rank($v_1$) and order($v_0$)>order($v_1$). Informally, $C_0$ is left of $C_1$ on all ranks they have in common.

Our approach is a modification of the DAG version of the iterative heuristic of Sugiyama. We call this heuristic mincross because it attempts to place nodes to avoid edge crossings. A significant modification of the heuristic is needed for cluster layout, because the cluster bounding box condition on the output ordering implies that nodes in different clusters may not be intermixed during the adjustment of node ordering. To satisfy this condition, it is convenient to operate on each cluster level-by-level, collapsing sub-clusters into virtual node chains that we call skeletons. This ensures the condition when $u_0$, $u_1$, $v_0$, $v_1$ are all on the same rank. To also ensure that skeletons do not cross between ranks, we assign a very high count to the skeleton edges. In our implementation, count is set to 1000 if 32 bit integer arithmetic is available, otherwise it is 100. Consequently, skeletons can exchange relative positions during mincross, but in practice do not cross in the output ordering. This ensures the output condition in the case that $u_0$, $u_1$, $v_0$, $v_1$ are on two different ranks.

```
1.   mincross_graph(G)
2.   for H in clusters(C) do
3.       collapse_cluster(H)
4.   end
5.   build_initial_layout(G)
6.   mincross(G,TRUE)
7.   if (G has clusters) do
8.           for H in clusters(C) do
9.                   mincross_cluster(H)
10.  end
11.  mincross(G,FALSE)
12.          end
13.      end
14.  end
15.
16.  mincross_cluster(G)
17.      expand_cluster(G)
18.      mincross(G,TRUE)
19.      if (G has clusters) do
20.          for H in clusters(G) do
21.                  mincross_cluster(H)
22.          end
23.          mincross(G,FALSE)
24.      end
25.  end
```

Notes: A key point is that node placement information flows both into and out from clusters. Clusters are collapsed into skeletons before running mincross on the enclosing graph or parent cluster. An estimate of the placement of nodes outside these clusters is known before their internal nodes are placed. Such information guides the internal layout of clusters. On the other hand, after the internal ordering of nodes in a cluster $H_i$ is known, this can affect ordering outside $H_i$ in two ways. First, the ordering of nodes in sibling clusters $H_j$ drawn after $H_i$ is affected by $H_i$ if there are connecting edges. Second, the ordering of free nodes in the parent of $H_i$ are updated after all $H_i$ are processed. This helps to avoid many layout anomalies that are caused in practice by fixing either nodes in $H_i$ or free nodes in the enclosing graph too early.

build—initial—layout(G): First, any edge e=(u, v) that points backward (rank(u)>rank(v)) is replaced by a representative edge (v,u). Second, any edge e=(u, v) where rank(v)−rank(u)>1 is replaced by a path of virtual nodes and edges. If len=rank(v)=rank(u) then the path is (u, virtual$_0$, virtual$_1$, ... virtual$_{len-1}$,v) where rank(virtual$_i$)=rank(u)+i. Third, the vlists of G are allocated by counting the number of nodes in each rank of G. Finally, an initial ordering of free nodes and rankleaders (virtual nodes created when a cluster is collapsed) is set using breadth-first search. This is a standard technique that was previously used in DAG (E. R. Gansner, S. C. North, and K. P.-Vo, "DAG—A Program that Draws Directed Graphs," *Software: Practice and Experience,* 18:11, pp. 1047–1062, 1988.)

In the preferred implementation, the memory of the vlist arrays are shared among G and all its nested clusters. rank(v) and order(v) are considered global labels. Thus when two nodes u, v are exchanged in the vlist of a cluster, the update is immediately visible in all vlists.

mincross(G,flag): This is a modified version of the DAG heuristic. The modifications are as follows. Before running the main loop of the mincross heuristic on G, the clust pointer of each node v in the vlist of G is set. If v is a free node of type REAL then clust is set to nil. If v is a bound node of type REAL then clust refers to the cluster of G to which it belongs. If v is a RANK-LEADER then clust is set to the subgraph it represents. If v is VIRTUAL, then clust is nil.

Thereafter, the value of the flag argument controls the behavior of mincross. DAG and DOT both have a predicate function left2right(u, v) called by mincross to test if u and v may be exchanged in the vlist of a graph, during the process of searching for orderings of the nodes of G that avoid edge crossing. We modify left2right to also accept flag as an argument. Note that flag is TRUE when subgraphs of G have been collapsed into skeletons and these are allowed to change positions relative to other nodes. Otherwise flag is FALSE to signify that subgraphs of G have been expanded and only the free nodes of G can move. Thus when flag is FALSE, u, v cannot be exchanged if either has its clust pointer set. Note how setting the clust of VIRTUAL nodes to nil allows virtual edges to cross cluster boundaries to route edges.

collapse—cluster(H): Nodes and edges of H are temporarily replaced by a skeleton. Any edge c with two endpoints inside H is thus hidden. Any edge e=(u, v) with exactly one endpoint in H is preprocessed as followed. Define mapcluster(G, v)=v if v is free in G, else rankleader(v). If there does not already exist a path (mapcluster(G,u),mapcluster(G,v)) then a path P is constructed with to—original pointers set to e, and the to—virtual pointer of e is set to the first edge in P. Otherwise, a path P already exists either by representing a multi-edge of e, or an edge on other endpoints (u′, v′) that have the same values of mapcluster. In this case e is merged into P by incrementing the values of weight and count along the virtual edges of P by weight(e) and count(e).

expand—cluster(H): It, currently represented by a skeleton, is replaced by its free nodes and skeletons of sub-clusters. The construction involves installing the nodes and edges of H as follows. The clusters inside H are collapsed. Long edges inside H are converted to virtual node chains. Then, an initial ordering of the nodes of H is computed using build—initial—layout ignoring any edges to nodes outside H. The initial layout is constructed in temporary vlist arrays not shared with any other graphs. The leftmost node in each rank is assigned order=0. After construction, the layout is merged into the globally shared vlist of H as follows. For each rank r of H, every node v is assigned the global order(v)=order(v)+order(rankleader(v)). Nodes outside H and to its right must also be reordered. Let $N_r$ be the highest order of nodes in rank r in H. For any node v such that order(v)>order(rankleader(r)), set order(v)=order(v)+$N_r$−1. The remaining work is to install the edges e=(u, v) with one endpoint in H and the other outside H. Each of these edges must have a path P=(mapcluster(G, u), mapcluster(G, v)) assigned in collapse—cluster. Let f be the first edge of P. If count(f)=count(e), then the endpoints of P are moved to (u, v). If count(f)>count(e) then a new path P' between (u, v) is created adjacent to the nodes of P, and the edges of P are adjusted by decrementing count(e) and weight(e) from their count and weight values. The new path consists of new virtual nodes and edges such that for every virtual node vp in P, we create a new virtual node rip, with order(vp,)=order(vp)+1. Also, for any node w where order(w)>order (vp), set order (w)=order(w)+1.

Figure 4A:
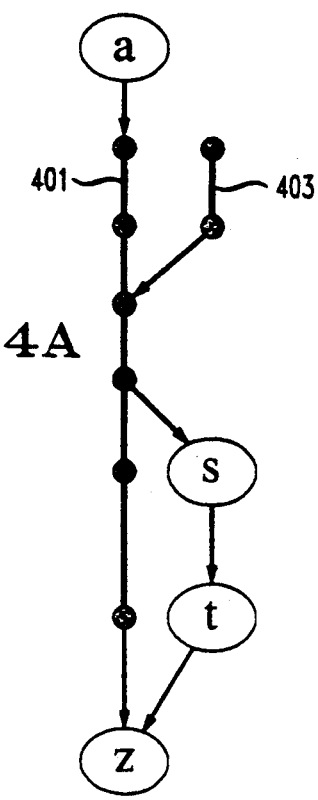
FIGS. 4A-4B shows how the graph of FIG. 1 is processed by mincross.
Figure 4B:
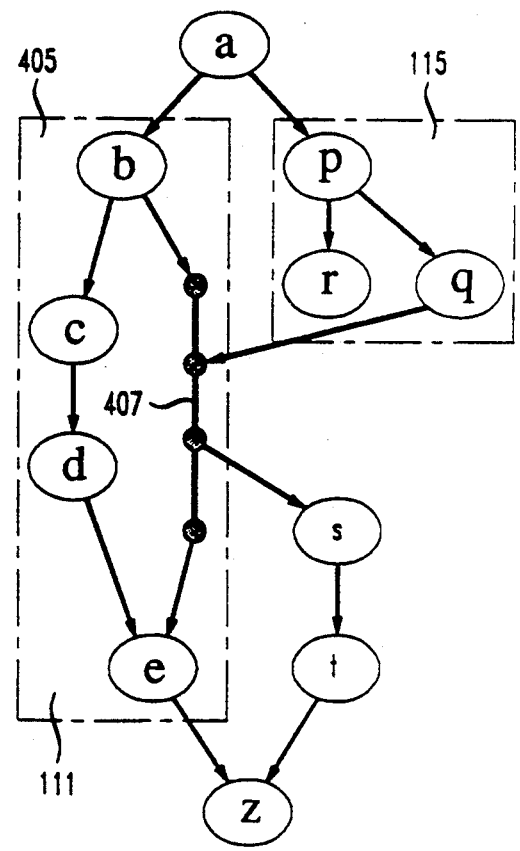

Following the example of FIG. 1, the initial configuration determined by build—initial—layout is shown in FIG. 4(a) with the clusters 111 and 115 collapsed into skeletons 401 and 403. Mincross is run on this graph, and then top-level clusters are expanded. As shown in 4(b), the expansion of 401 into 405 involves the creation of a skeleton 407 (corresponding to cluster 113). After running mincross on 401, skeleton 405 is expanded (yielding the full graph of FIG. 1) and the contents of cluster 113 are processed by mincross. Finally, when returning from the recursive calls to mincross, the positions of free nodes such as s may be updated by the mincross heuristic procedure to reduce edge crossings.

Figure 5:
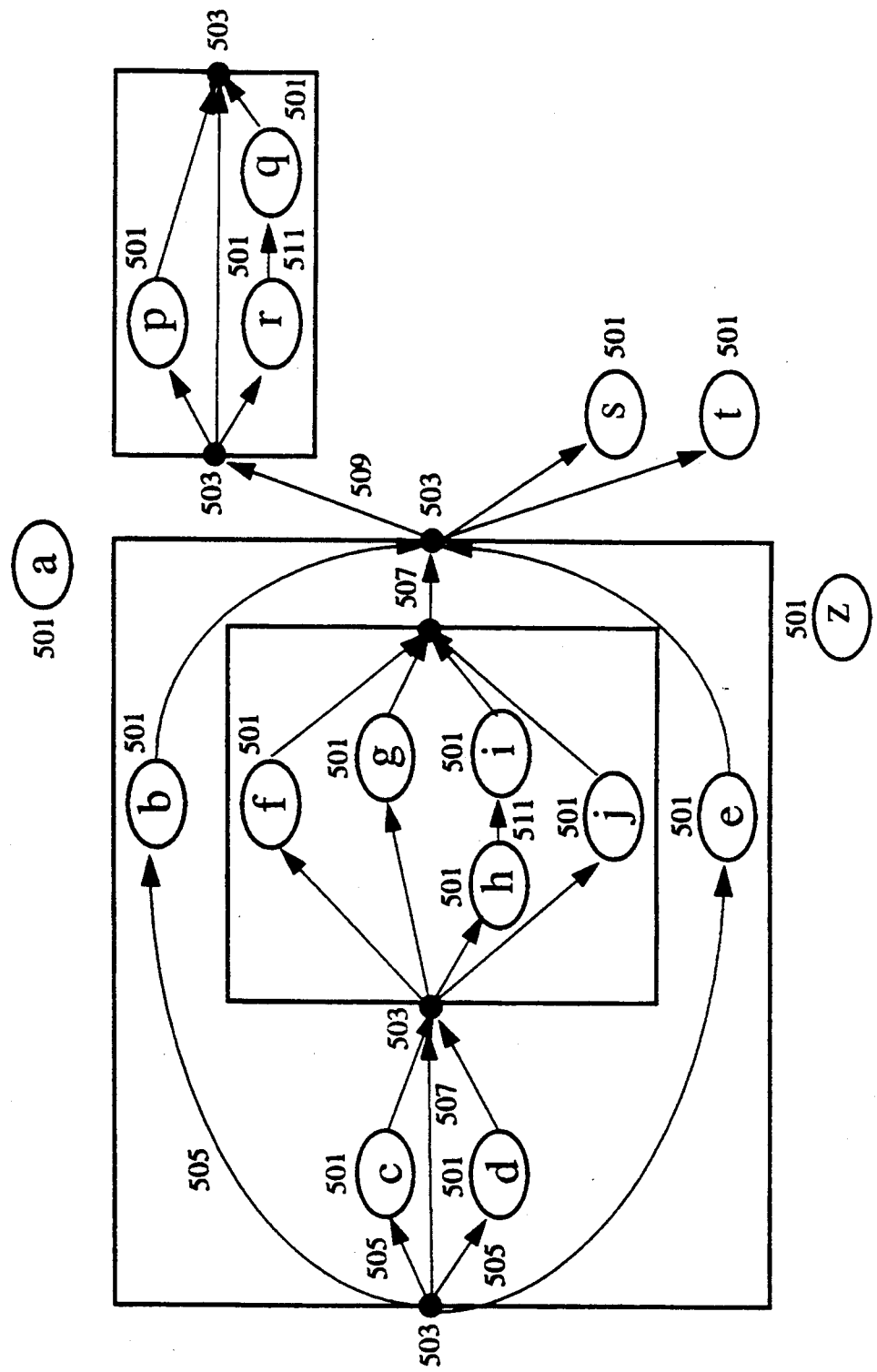
FIG. 5 shows how the nodes of the graph of FIG. 1 are ordered within their ranks.
Figure 6:
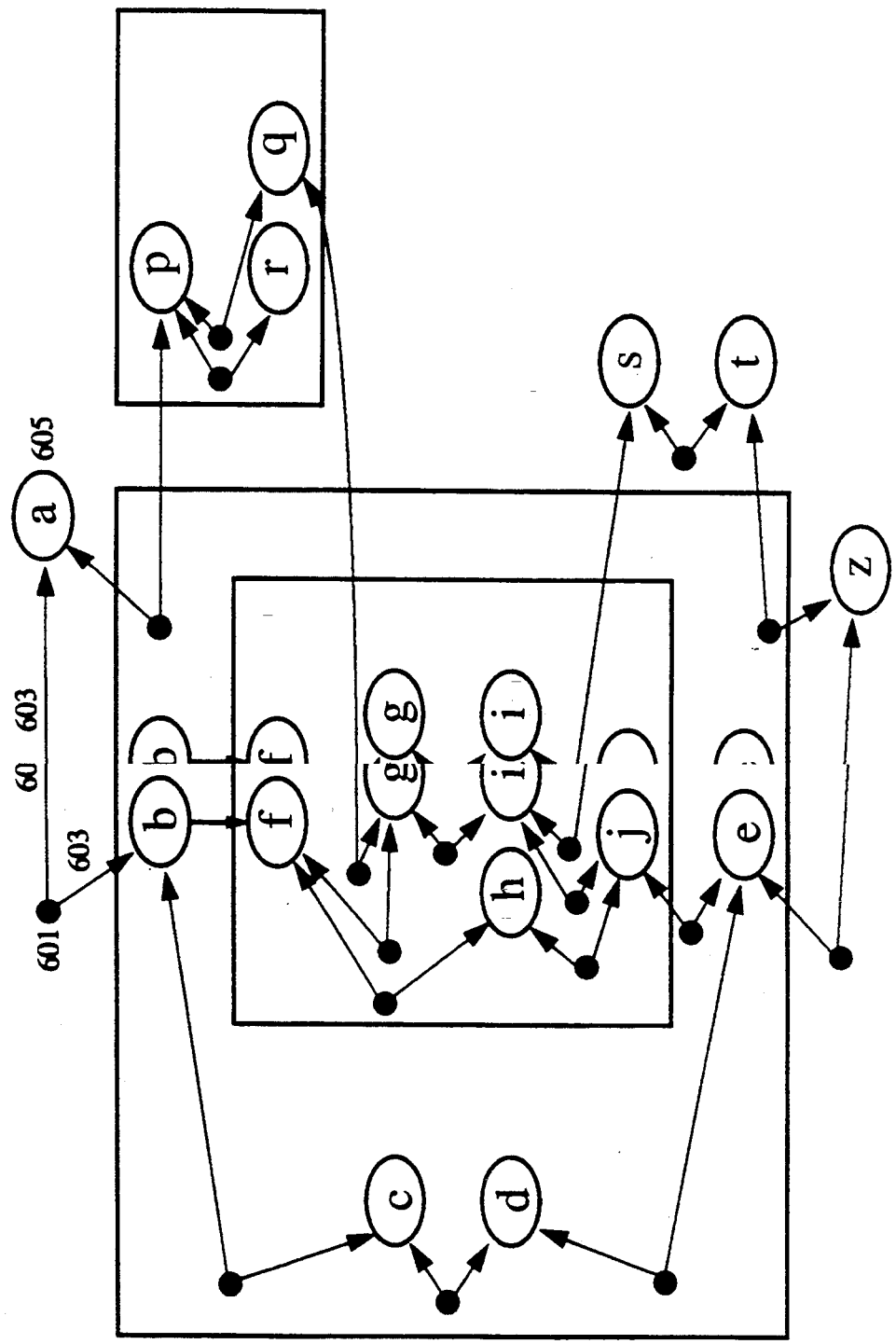
FIG. 6 shows how the locations of node edges are determined.
Figure 8:
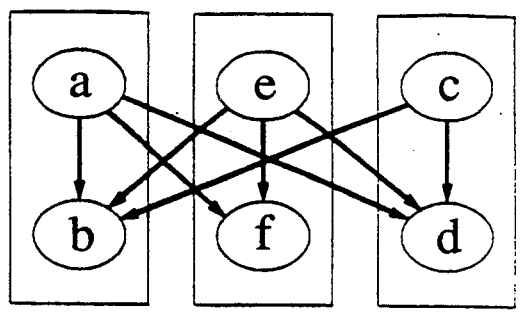
FIG. 8 shows the graph of FIG. 7 drawn using the techniques of the invention.
Figure 7:
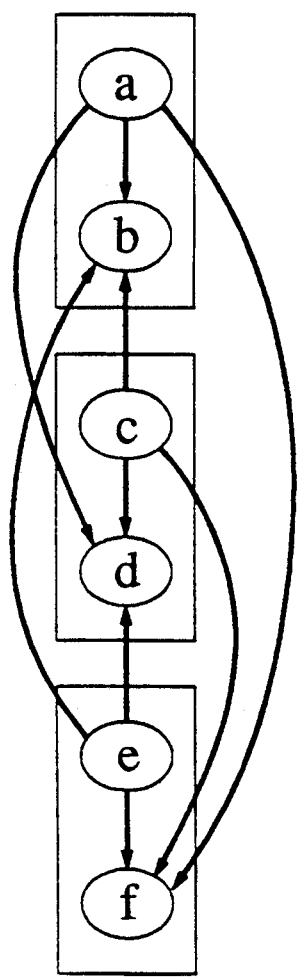
FIG. 7 shows a bipartite graph drawn according to the prior art.
Figure 9:
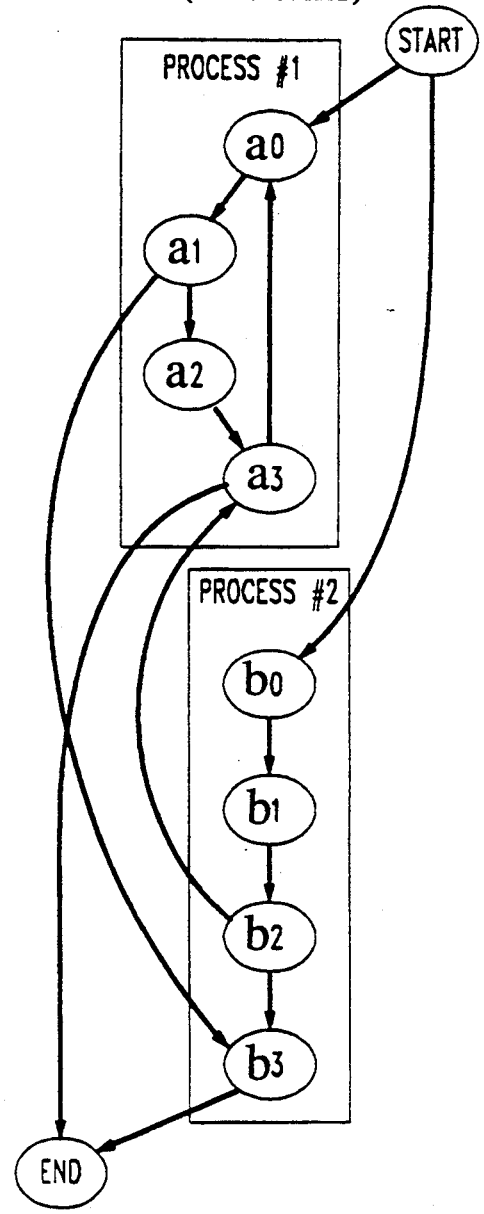
FIG. 9 shows a process graph drawn according to the prior art.
Figure 10:
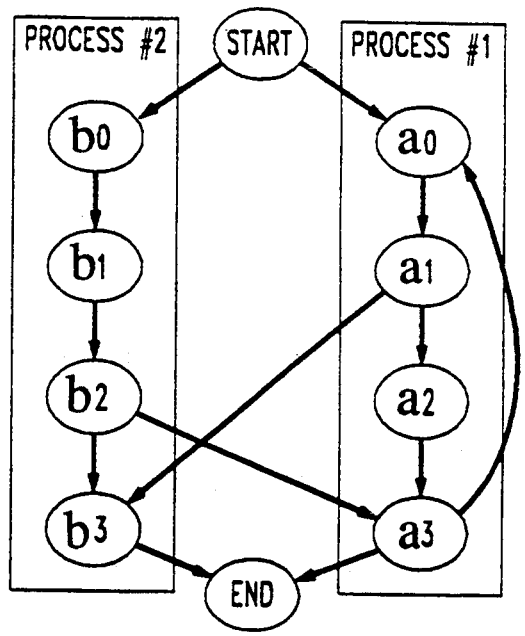
FIG. 10 shows the graph of FIG. 9 drawn using the techiques of the invention.
Figure 11:
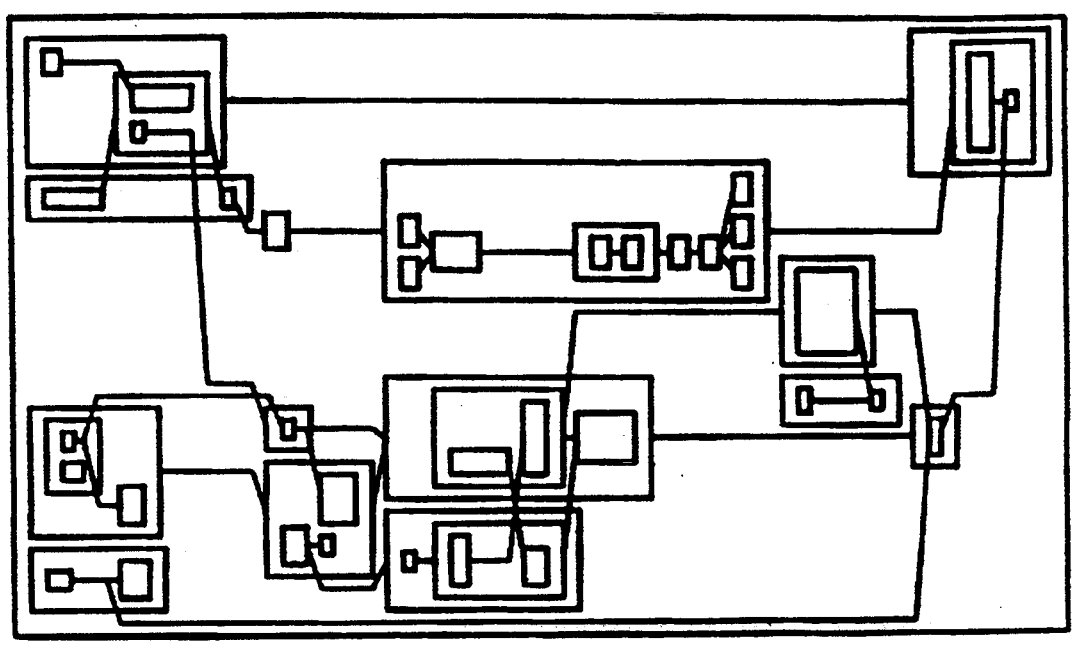
FIG. 11 shows a graph drawn using prior-art techniques.
Figure 13:
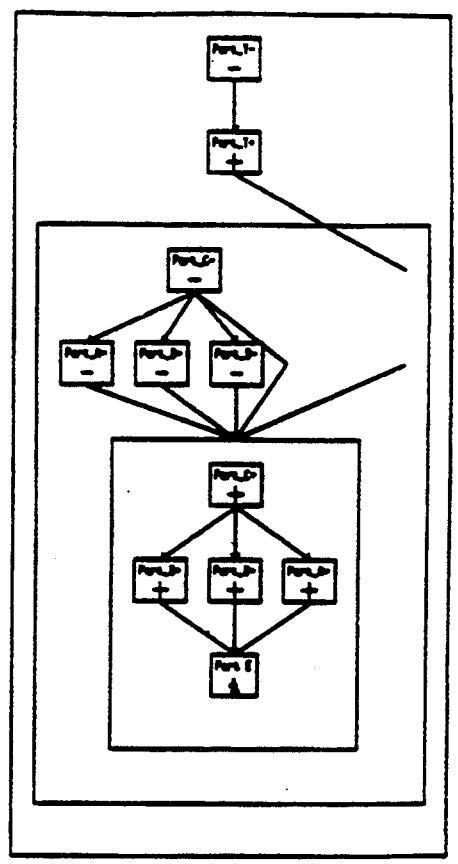
FIG. 13 shows still another graph drawn using prior-art techniques.
Figure 14:
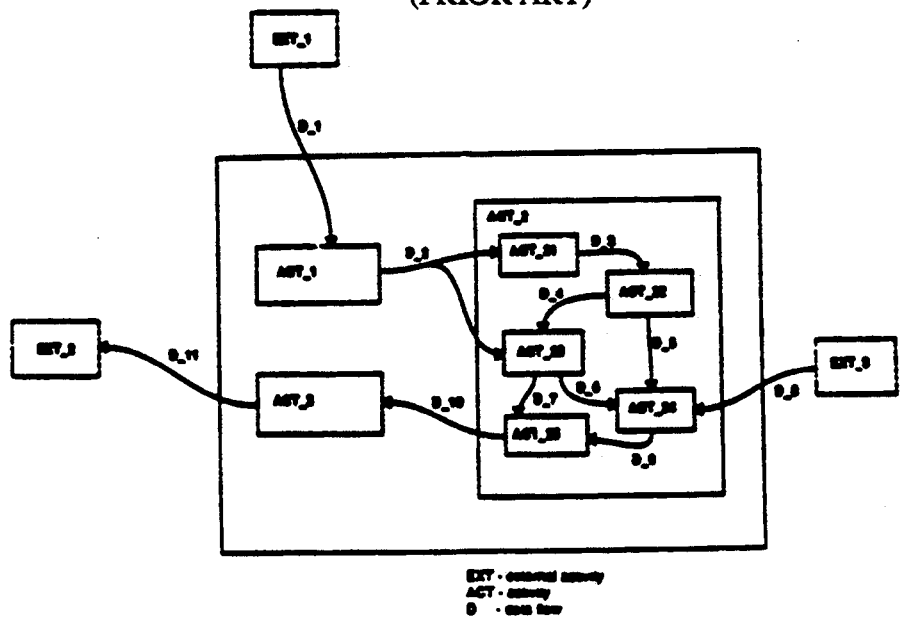
FIG. 14 shows a graph which has been laid out by hand.
Figure 15:
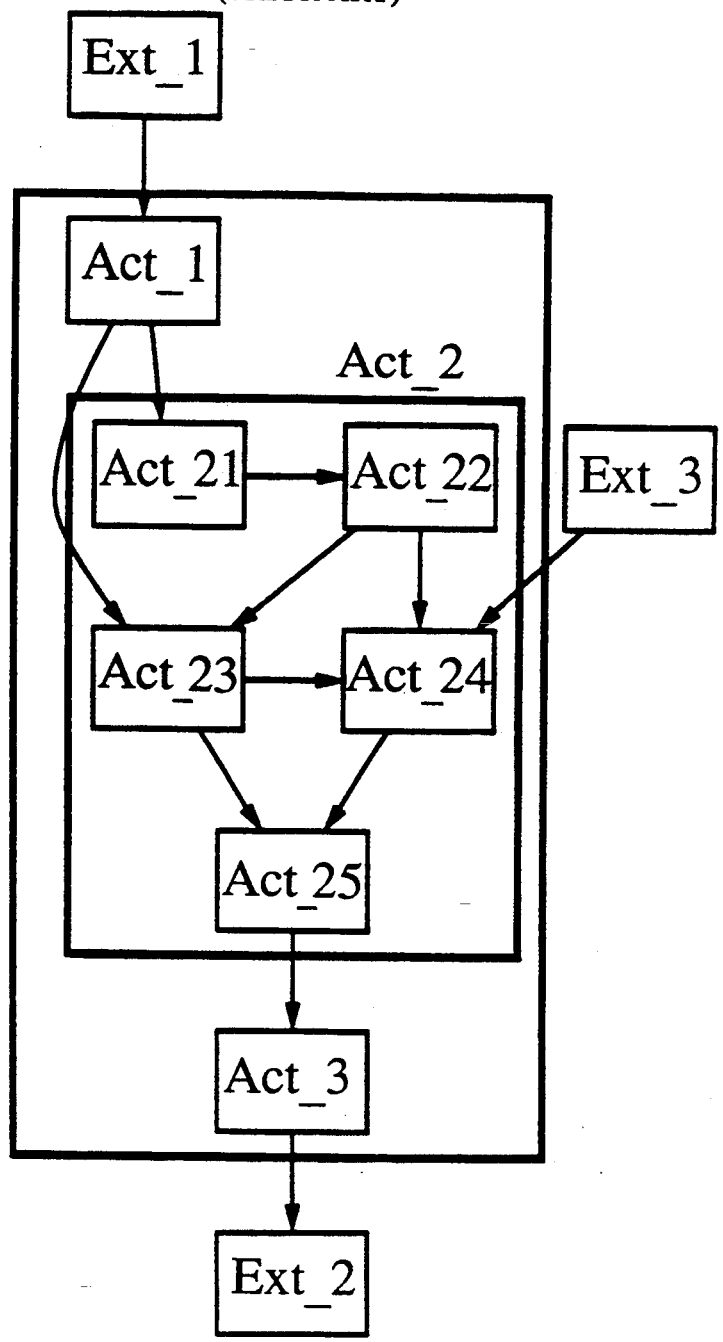
FIG. 15 shows an automatic layout of the graph using prior-art techniques.
Figure 16:
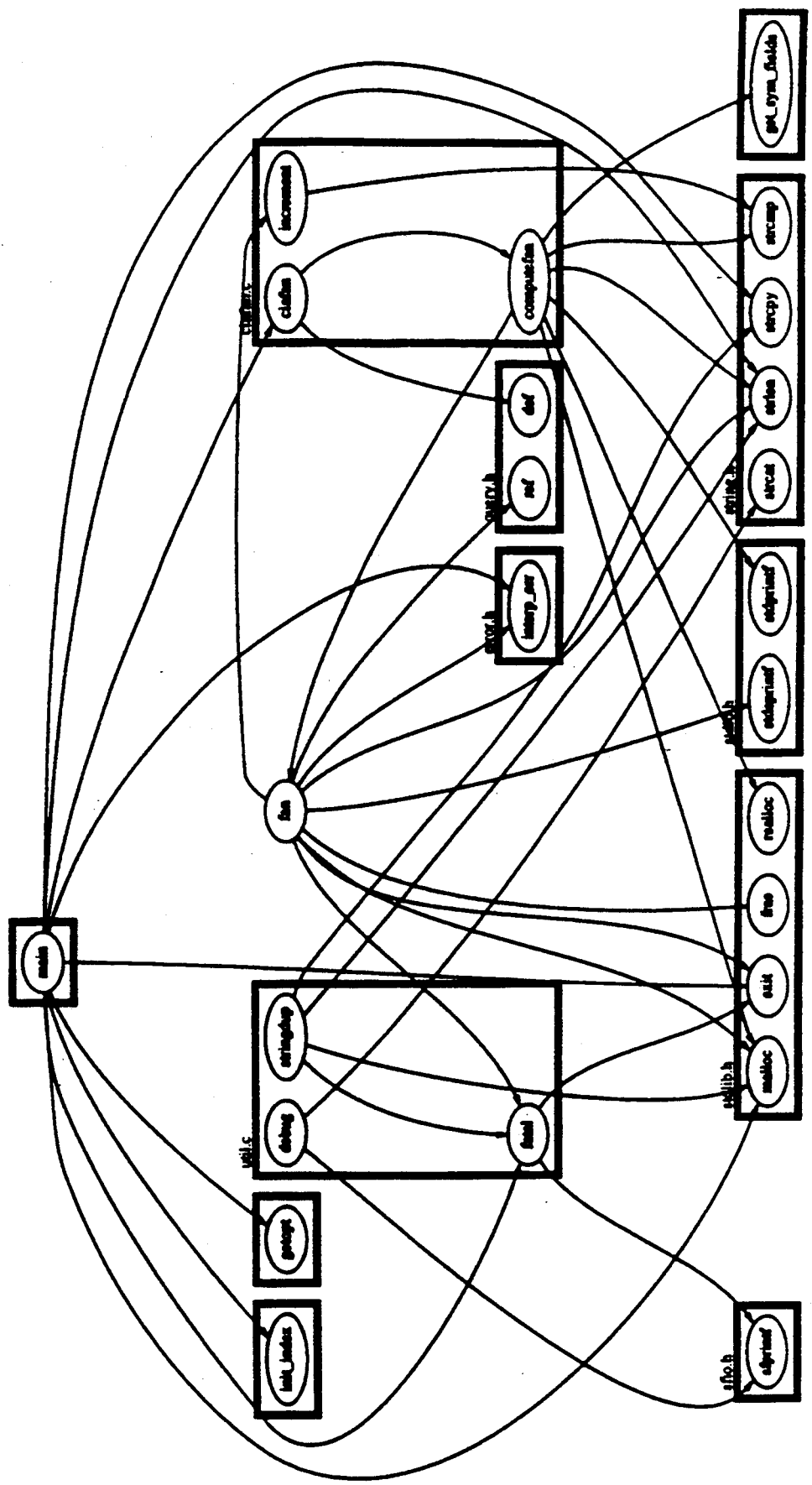
FIG. 16 shows a procedure call graph laid out according to the techniques of the invention.
Figure 17:
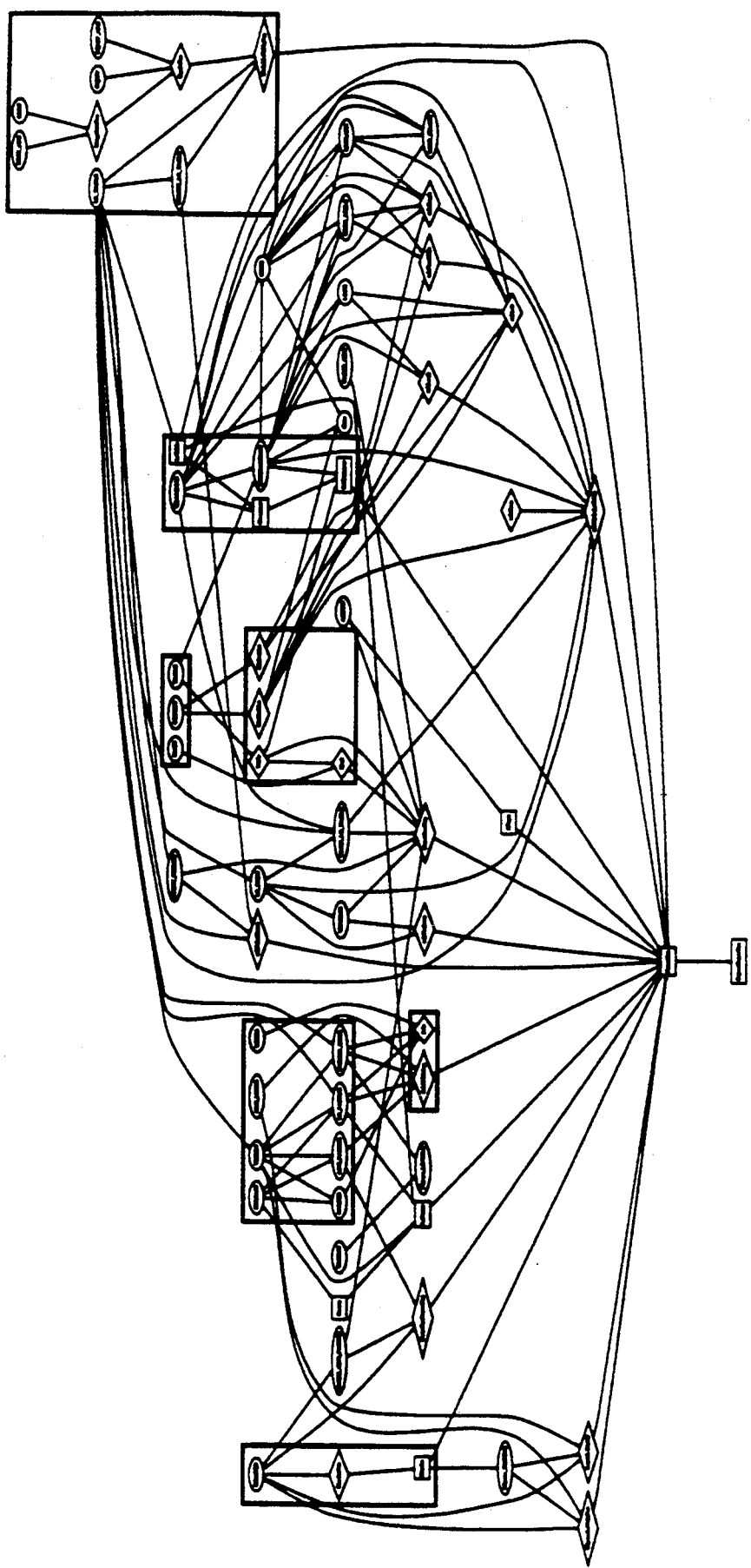
FIG. 17 shows another such procedure call graph.

NODE POSITION: FIGS. 5 and 6

This phase computes (x, y) layout coordinates for nodes, subject to rank(v) and order(v) already set. It is convenient to assume that the vlist arrays are present from the mincross phase, but if another algorithm were used to determine order(v), then the vlists could be constructed by scanning the node lists of each graph. Thus the following algorithm for computing node coordinates is independent of the previous steps.

Y coordinates of nodes are set as in the standard implementation of DOT, except the separation between ranks $r_i$ and $R_{i+1}$ is increased by (nlev)(nodesep(G)). nlev is the maximum difference in the depth of nested clusters having a horizontal bounding box edge between $r_i$ and $r_{i+1}$. This adjustment allows space for the horizontal sides of cluster bounding boxes to be drawn between adjacent ranks, with a margin of nodesop(G) all around.

The remainder of the discussion concentrates on X coordinates. Both virtual and real nodes have assigned coordinates. Though virtual nodes do not appear directly in the layout, their coordinates do guide spline fitting, as described by Gansner, Koutsofios, North, Vo, ibid. This reference also explains a technique for assigning node coordinates in graphs without clusters, by formulating a restricted linear program that can be solved by the standard network simplex technique also already used in phase 1.

The objective function is:

$$\min \sum_{(u,v) \in E} |x(u) - x(v)|$$

subject to constraints on the left-to-right placement of nodes and clusters, as described below. Informally, these constraints enforce the ordering of nodes within ranks, and the ordering and nesting of clusters.

The following is a modification of the technique described by Gansner, Koutsofios, North, Vo, ibid. One can think of this as "turning the graph on its side" so that ranks correspond to X coordinates, in units of 1/72 inch, instead of Y coordinates. In several ways this technique is superior to heuristics described in the prior art: it finds layouts that are optimal with respect to a precise objective function, it is easy to implement, and it is amenable to useful extensions that can be encoded as constraint edges. However it is not suitable to perform this on the input graph G because the edges do not imply any left-to-right ordering of nodes (though they do imply top-to-bottom placement). Therefore, the rank assignment is computed on an auxiliary graph G' that is constructed from G for the purpose of finding X coordinates by solving a rank assignment problem. The construction is performed by a linear scan of the nodes, edges, and clusters of G. The nodes of G' are the nodes of G (including virtual nodes to represent long edges) and additional virtual nodes: one for each edge in G (including virtual edges to represent long edges) and two for each cluster (the left and right bounding box X coordinate). The edges of G' can be divided into those that constrain left-to-right ordering of nodes and clusters, and those that represent layout cost of edges of G.

The construction of G' is performed by a linear scan of nodes, edges, and clusters of G. The nodes (variables) of G' and the edges (constraints) are listed below:

nodes for v in V(G): $x_v$
for e in E(G): $x_e$
for c in Clusters(G): $x_{cleft}, x_{cright}$ edges to separate adjacent nodes on the same rank
for v, w in V(G) where rank(v)=rank(w) and order(v)=order(w)−1:
 $x_v \rightarrow x_w$[weight=0, minlen=width(w)/2 +width(v)/2 +nodesep(G)]
to enforce node containment in clusters
for C0 in Clusters(G)
for v in V(C0) such that v does not belong to any C1 in Clusters(C0):
 $x_{cleft} \rightarrow x_v$[weight=0, minlen=Nodesep]
 $x_v \rightarrow x_{cright}$[weight=0, minlen=Nodesep]
to enforce nesting of clusters
for C0,C1 in Clusters(G) where C0=parent(C1)
 $x_{C0left} \rightarrow x_{C1left}$[weight=0, minlen=Nodesep]
 $x_{C1right} \rightarrow x_{C0right}$[weight=0, minlen=Nodesep]
to enforce adjacent cluster separation for C0,C1 in Clusters(G) where parent(C0)=parent(C1)
  if there exist v in V(C0) and w in V(C1)
    where rank(v)=rank(w) and order(v)=Order(w)−1;
  $x_{C0right} \rightarrow x_{C1left}$[weight=0, minlen=Nodesep]
to compact clusters
for C in Clusters(G)
  $x_{Cleft} \rightarrow x_{Cright}$[weight=W, minlen=Nodesep]
to measure the layout cost of weighted edges
  for e=(v,w) in E(G):
  $x_e \rightarrow x_v, x_e \rightarrow x_w$[weight=weight(e), minlen=0]
Note that when edges are connected to a port (offset coordinate) of v or w, minlen is adjusted (Gansner, Koutsofios, North, Vo, ibid).

The value of W in our implementation is 50.

The construction of these constraints for our main example is illustrated in FIGS. 5 and 6. FIG. 5 shows edges that control left to right ordering. Components marked 501 are original nodes of the layout. Components marked 503 are virtual nodes for cluster bounding box coordinates. Components marked 505 are virtual edges that constrain nodes 501 with respect to cluster bounding box coordinates 503. Components marked 507 are edges to enforce the nesting of clusters. Components marked 509 are edges to enforce the left-to-right ordering of adjacent clusters. Components marked 511 are edges to enforce the left-to-right ordering of nodes 501.

FIG. 6 shows edges that encode the layout cost of stretching input edges by X coordinate displacement of their endpoints. This diagram shows the construction for replacing each input edge with a virtual node 601 and two edges 603. Each edge 603 connects a virtual node 601 and one of the input nodes 605.

The constraint graph presented to network—simplex is the union of the nodes and edges shown in FIGS. 5 and 6. This graph is acyclic (all edges can be oriented from left to right ). As previously described, the ranks determined for the auxiliary graph are then be read off as X coordinate assignments to nodes and cluster bounding boxes of the original graph.

A final observation is that better layouts result when edge splines are routed so as to avoid bounding boxes of clusters that do not contain an endpoint node. The routine in DOT that finds the extent of the white space adjacent to a given node has been modified in this implementation to limit the region returned so as not to cross into any adjacent cluster bounding box.

CONCLUSION

The foregoing Detailed Description has disclosed to those of ordinary skill in the art the techniques employed in the present invention to produce directed graphs which are aesthetically more pleasing, easier to read, and more compact than those provided by prior-art techniques. Although the implementation of the techniques disclosed herein is the best presently known to the inventor, it will be immediately apparent to those of ordinary skill in the art that many variations in the implementation are possible. Further, though it is particularly advantageous to employ the techniques disclosed herein together, it is also advantageous to employ them separately. All of the above being the case, the foregoing Detailed Description is to be understood as being in every respect illustrative and exemplary, but not restrictive, and the scope of the invention disclosed herein is not to be determined from the Detailed Description, but rather from the claims as interpreted with the full breath permitted by law.

What is claimed is:

1. A method of using a computer system to automatically draw a directed graph, the directed graph and clusters therein being made up of free nodes which do not belong to contained clusters and bound nodes which do, the method including a step of assigning ranks to the nodes and the method being improved in that the step of assigning ranks comprises:
   recursively performing on the directed graph and the contained clusters contained therein steps including
   assigning relative ranks to each contained cluster,
   collapsing each contained cluster into a virtual node, and
   assigning relative ranks to the free nodes and virtual nodes; and on completion of the recursive steps, assigning absolute ranks to all nodes, with the rank of a free node within a cluster being determined by the absolute rank of the virtual node into which the cluster was collapsed and the relative rank of the free node within the cluster.

2. A method of using a computer system to automatically draw a directed graph of nodes which includes subgraphs grouped in clusters, the method including a step of assigning ranks to the nodes and the method being improved in that the step of assigning ranks to the nodes comprises:
   assigning a relative rank to each contained node or cluster contained in the graph or cluster which is relative to the graph or cluster which immediately contains the contained node or cluster; and
   assigning an absolute rank to each node or cluster which is determined from the absolute rank of the graph or cluster which immediately contains the contained node or cluster and the relative rank of the node or cluster.

3. The method set forth in claim 2 wherein:
   the step of assigning a relative rank is done by recursively performing steps including
   assigning relative ranks to each contained cluster;
   collapsing each contained cluster into a virtual node; and
   assigning relative ranks to the free nodes and virtual nodes.

4. The method set forth in claim 3 further comprising the step of:
   replacing edges whose endpoints are in contained clusters with a virtual node with edges connecting the virtual node to the endpoints.

5. The method set forth in claim 2 further comprising the step of:
   in each collapsed cluster, establishing ports for edges having endpoints in nodes belonging to the collapsed cluster corresponding to the relative ranks of the nodes which are endpoints of the edges.

6. A method of using a computer system to automatically draw a directed graph of nodes which includes subgraphs grouped in clusters, the method including a step of ordering the nodes within a rank the method being improved in that the step of ordering the nodes within the rank comprises:
   collapsing each contained cluster immediately contained in the rank into a representation of the entire cluster; and
   ordering the nodes within the rank by treating the representations as nodes.

7. The method set forth in claim 6 wherein the step of assigning ranks to the nodes further comprises the steps of:

for each collapsed cluster, expanding the collapsed cluster while collapsing any contained cluster;

ordering the nodes immediately contained in the expanded cluster together with the collapsed contained cluster; and reordering the nodes immediately contained in the expanded cluster and the other nodes in the rank as required for the expanded cluster, 8. The method set forth in claim 7 wherein:

the step of reordering is such that a node in an expanded cluster does not change places with a node outside the expanded cluster.

9. The method set forth in claim 7 wherein:

the step of expanding the collapsed cluster is performed recursively for each cluster contained in the collapsed cluster.

10. The method set forth in any of claims 7, 8, or 9 wherein:

the step of ordering the nodes within the rank, ordering the nodes immediately contained in the expanded cluster, or reordering the nodes immediately contained in the expanded cluster includes a step which determines how to reorder the nodes and any immediately-contained collapsed cluster to reduce crossings of edges.

11. The method set forth in claim 10 wherein:

the step which determines how to reorder the nodes includes the steps of:

assigning weighted constraint costs to the edges which include costs derived from internal ranks of nodes inside subclusters and determining the reordering by solving a series of linear programs to determine an ordering which minimizes the total constraint costs.

12. A method of using a computer system to automatically draw a directed graph of nodes which include subgraphs grouped in clusters, the method having steps comprising:

assigning ranks to the nodes, to the subgraphs, and to the nodes contained in the subgraphs; and ordering the nodes within the ranks in order to reduce the number of edges in the graph which cross other edges therein and the method having the improvement comprising:

in the step of assigning ranks to the nodes, the steps of:

assigning a relative rank to each node or cluster which is relative to the graph or cluster which immediately contains the node or cluster, and assigning an absolute rank to each node or cluster which is determined from the absolute rank of the graph or cluster which immediately contains the node or cluster and the relative rank of the node or cluster; and in the step of ordering the nodes within the ranks, the steps of:

collapsing each cluster immediately contained in the rank into a representation of the entire cluster, and ordering the nodes within the rank by treating the representations as nodes.

\* \* \* \* \*